(12) United States Patent
Low (10) Patent No.: US 8,452,444 B1
(45) Date of Patent: May 28, 2013

(54) SYSTEM AND METHOD FOR ENTERPRISE CONTENT MANAGEMENT

(75) Inventor: Jeffrey S. Low, Palm Springs, CA (US)

(73) Assignee: Storetrieve, Inc., Montebello, CA (US)

( * ) Notice: Subject to any disclaimer, the term of this patent is extended or adjusted under 35 U.S.C. 154(b) by 924 days.

(21) Appl. No.: 12/555,711

(22) Filed: Sep. 8, 2009

(51) Int. Cl.
*G06F 7/00* (2006.01)

(52) U.S. Cl.
USPC .......................................... 700/215

(58) Field of Classification Search
USPC .................................. 700/213, 215
See application file for complete search history.

(56) References Cited

U.S. PATENT DOCUMENTS

| | | | |
|---|---|---|---|
| 2007/0045930 A1* | 3/2007 | Hayduchok et al. | 271/2 |
| 2007/0050696 A1* | 3/2007 | Piersol et al. | 715/500 |
| 2007/0192423 A1* | 8/2007 | Karlson | 709/206 |
| 2008/0155652 A1* | 6/2008 | DeBie | 726/2 |

* cited by examiner

*Primary Examiner* — Ramya Burgess
(74) *Attorney, Agent, or Firm* — Fernandez & Associates, LLP (57) ABSTRACT

A method for enterprise content management to ensure enterprise records retention compliance based on an automated document storage system and an automated document destruction mechanism.

18 Claims, 4 Drawing Sheets

SYSTEM AND METHOD FOR ENTERPRISE CONTENT MANAGEMENT

BACKGROUND OF THE INVENTION

1. Field of the Invention

The present invention relates to computers and computer based automation. More particularly, the invention relates to enterprise content management with a focus on corporate risk aversion management.

2. Background of the Related Art

Enterprise information assets, (i.e., corporate documents or records) have moved from a low priority business necessity to a high priority mandatory business process, which may be associated with a wide source of legal risk. That which was once merely good business practice of keeping complete and orderly records is now required by law for certain information as well as required as "insurance" to mitigate legal risk. Because of the risk in records management when not conducted according to "best practices," motivation is now more than just to keep a file in case it may be needed in court.

Specific laws such as HIPAA, FACTA, Sarbanes-Oxley, etc., dictate specific requirements of records safeguarding. In addition, there are "best practice" standards recognized in the industry. Courts expect that files are managed in an orderly fashion, such that any file pertinent to litigation can be found within a reasonable period, and that it is the original, authentic and unaltered information. If a file is not available, then there needs to be a best-practices reason, such as that it was destroyed in a compliant manner.

For example, forensic legal discovery, as prescribed for in (FRCP) Rules 26(b) (2) (A-F) and 37, is a chief legal risk in records management. This is an order by the court, given in favor of one party, to "move in" on the other party's operations, on-site and off-site, to search through all records repositories, such as cabinets, shelving, desks, computers, disk drives, networks, etc. Such orders are given to one party by the courts when the other party has breached the record keeping best practices standard.

As a result, companies are trying to catch up. In doing so, companies have allowed their information assets to escape uncontrolled into the digital realm, via document imaging. Research shows that the two motivations for these pursuits were achieving compliance and reducing hard copy storage volume and costs. However, this may be a mistake on both counts in many circumstances for the following reasons.

A paper document can be stored physically and professionally for over 50 years, for the same cost as imaging, a by-product of paying per box, rather than using leased or mini-storage space that is always too empty or too full. Automated document storage or library systems have been developed using robotic mechanisms such that boxed documents can be stored and retrieved in an automated fashion. Examples of such automated storage systems are described in U.S. Pat. Nos. 5,513,156 and 5,914,819. If stored and indexed properly, off-site paper storage meets the requirements for best practices until retrieved. Using the paper approach, the problems associated with electronic documents, such as data migration, faulty storage media, the operational cost for verification, loss of control and theft, etc. are eliminated. Further, a disgruntled employee can walk out with un-determined amounts of proprietary information held on disks, lap-tops, etc. Such is more difficult with boxes of files.

Isolating computers, drives, disks, lap-tops and other repositories for a company's electronic storage is required for companies that have gone the paper-less road. However, their motivation of avoiding legal discovery is made worse because the discovery process now includes an adversarial search through electronic information.

Because of the scenarios described above, the legal tactic of discovery has shifted from seeking documents germane to a case to determining whether the opposition party is records-management compliant and exploiting the same with an order of forensic discovery, which impatient courts are willing to grant. Methods to compel discovery have reached an art form. One tactic is to seek more types of documents than needed, making it more difficult for the opposition party to comply. Specific renditions of documents are also demanded in other tactics, such as data in its "native state," not text dumps, PDF's or other derivative forms. This includes e-mails not in text, but in their binary form with the legal "motivation" being to pick apart the electronic bits, including headers, footers and other information in potentially relevant contexts. Even more pertinent to all of this legal risk is that data in a search index can be used to re-construct a document even if the document itself has been irretrievably lost. Therefore, a document cannot be considered fully destroyed until the search index of the document is also destroyed.

The best-practices standard, consistent with the expectation by the courts to withhold legal discovery, is to be records retention compliant.

SUMMARY

In general, in one aspect, the invention relates to a method for enterprise content management. The method includes storing a plurality of containers in an automated storage, at least one container having a container label and containing a plurality of document items, adding, using a processor of a computer, an index entry to a master index of the automated storage, wherein the index entry comprises identification information retrieved from the container label of the at least one container and location information specifying a location in the automated storage related to the container, wherein the automated storage is operative to store and retrieve the at least one container based on the master index, adding, using the processor of the computer, a retention entry to a retention schedule associated with the master index, wherein the retention entry specifies expiration information of the at least one container, causing, using the processor of the computer based on the retention entry, the at least one container to be retrieved from the automated storage based on the location information of the index entry, verifying the content of the at least one container based on the identification information of the index entry, destroying at least one document item of the plurality of document items based on the expiration information, and generating a certificate of destruction based on the identification information and comprising a time stamp associated with destruction of the at least one document item.

In general, in one aspect, the invention relates to a system for enterprise content management. The system includes an automated storage configured to store a plurality of containers, at least one container having a container label and containing a plurality of document items, a repository storing a master index of the automated storage and a retention schedule associated with the master index, wherein the automated storage is operative to store and retrieve at least one container based on the master index, a processor and memory storing instructions when executed by the processor comprising functionalities for adding an index entry to the master index, wherein the index entry comprises identification information retrieved from the container label of the at least one container and location information specifying a location in the automated storage related to the container, adding a retention entry to the retention schedule, wherein the retention entry specifies expiration information of the at least one container, causing the at least one container to be retrieved from the automated storage based on the retention entry and the location information of the index entry, and causing at least one document item of the at least one container to be transferred to and destroyed by an automated document destroyer based on the expiration information, and an automated document destroyer configured to verify content of the at least one container based on the identification information of the index entry, destroy the at least one document item responsive to a command from the processor, and generate a certificate of destruction based on the identification information and comprising a time stamp associated with destruction of the at least one document item.

In general, in one aspect, the invention relates to a computer medium storing instructions for enterprise content management. When executed by the processor, the instructions include functionalities for storing a plurality of containers in an automated storage, at least one container having a container label and containing a plurality of document items, adding, using a processor of a computer, an index entry to a master index of the automated storage, wherein the index entry comprises identification information retrieved from the container label of the at least one container and location information specifying a location in the automated storage related to the container, wherein the automated storage is operative to store and retrieve the at least one container based on the master index, adding, using the processor of the computer, a retention entry to a retention schedule associated with the master index, wherein the retention entry specifies expiration information of the at least one container, causing, using the processor of the computer based on the retention entry, the at least one container to be retrieved from the automated storage based on the location information of the index entry, verifying the content of the at least one container based on the identification information of the index entry, destroying at least one document item of the plurality of document items based on the expiration information, and generating a certificate of destruction based on the identification information and comprising a time stamp associated with destruction of the at least one document item.

Other aspects and advantages of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. In other instances, well-known features have not been described in detail to avoid obscuring the invention.

Generally speaking, the enterprise content management system may be used for ensuring enterprise records retention compliance based on an automated storage and an automated document destroyer controlled by a content manager.

Figure 1:
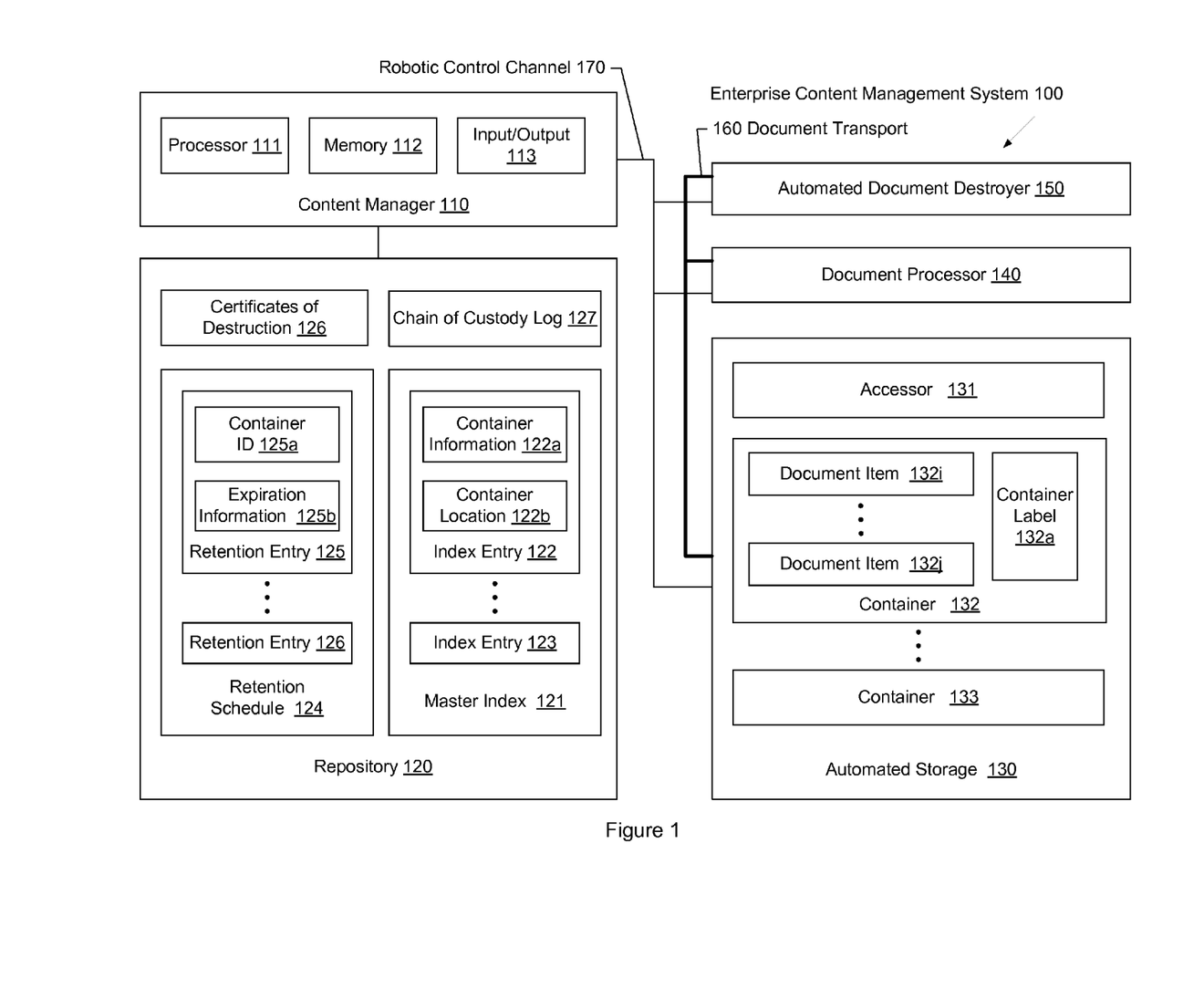
FIG. 1 shows a system block diagram according to aspects of the invention.

FIG. 1 shows a system block diagram of an enterprise content management system (100) in accordance with one or more embodiments of the invention. Those skilled in the art, having the benefit of this detailed description, will appreciate the components shown in FIG. 1 may differ among embodiments of the invention, and that one or more of the components may be optional. Although specific numbers of components are shown in FIG. 1, different number of each component may be included. In one or more embodiments of the invention, one or more of the components shown in FIG. 1 may be omitted, repeated, supplemented, and/or otherwise modified from that shown in FIG. 1. Accordingly, the specific arrangement of components shown in FIG. 1 should not be construed as limiting the scope of the invention.

As shown in FIG. 1, the enterprise content management system (100) includes content manager (110), repository (120), automated storage (130), document processor (140), automated document destroyer (150), document transport (160), and robotic control channel (170). Further, the repository (120) includes master index (121), retention schedule (110), and certificates of destruction (126). While one master index (121), one retention schedule (124), and one certificates of destruction (126) are shown in FIG. 1, any number of master indexes, retention schedules, and collections of certificates of destruction may be included. In one or more embodiments, each of the master index (121), the retention schedule (124), and the certificates of destruction (126) may be implemented as a database, a file, a linked list, or other suitable data structures. In one or more embodiments, two or more of the master index (121), the retention index (124), and the certificates of destruction (126) may be integrated in one data structure.

In one or more embodiments of the invention, the content manager (110) is configured to manage enterprise contents in the form of paper documents or records for best practice compliance. Throughout this document, the term "document" and "record" may be used interchangeably depending on the contexts. Further, the term "paper" refers to any tangible sheets of material such as paper, plastic, etc. and the term "paper document" refers to any tangible document (e.g., hardcopy) made of paper or other tangible materials throughout this document. Furthermore, the term "store" refers to either "initial deposit" or "return after prior retrieval" depending on the contexts. Although the following descriptions focus on enterprise contents in paper formats that are stored, retrieved, returned, and/or destroyed using at least some tangible (e.g., mechanical) mechanisms, it is contemplated that, in one or more embodiments, the invention may be applied to enterprise contents in electronic formats by substituting a portion of the tangible components with their electronic equivalents. More details of the content manager (110) are described later after the descriptions of the other system components are provided.

In one or more embodiments of the invention, the automated storage includes containers (132, 133, etc.). In one or more embodiments, one or more of the containers (e.g., 132) includes a container label (e.g., 132a) and document items (e.g., 132i, 132j, etc.). For example, the container (132) may be a box while the document items (132i, 132j, etc.) may be file folders, paper documents, or a page of a paper document. In another example, the container (132) may be a file folder while the document items (132*i*, 132*j*, etc.) may be paper documents or a page of a paper document.

In one or more embodiments, the container label (132*a*) is attached to the container (132) and includes information of the container (132) and the content of the container (132). For example, the container label (132*a*) may include information such as a container ID (e.g., for identifying the container in the enterprise content management system (100)), general description (e.g., title, category, ownership, summary, etc.) of the document items (132*i*, 132*j*, etc.) contained in the container (132), or other pertinent information.

In one or more embodiments, the general description of the document items included in the container label (e.g., 132*a*) includes document information (not shown) related to a particular document item ((e.g., one or more of 132*i*, 132*j*, etc.). For example, the container label (132*a*) may include document information such as a document type (e.g., vital document, non-vital document, records vital/imaged, records vital/paper, non-record historical, non-record/supplies, non-record/forms, non-record/library, non-record/miscellaneous, etc.) of the particular document item, an enterprise department (e.g., an owner department such as corporate office, accounting department, operations department, marketing department, sales department, research and development department, legal department, etc.) related to the particular document item, or other pertinent information.

In one or more embodiments, the container label (e.g., 132*a*) includes a barcode label (not shown). In one or more embodiments, the container label (e.g., 132*a*) includes a magnetic tag (not shown).

In one or more embodiments of the invention, the automated storage includes accessor (131). In one or more embodiments, the accessor (131) is configured to store and retrieve the containers (132, 133, etc.) under the control of the content manager (110). In one or more embodiments, the accessor (131) is configured to physically move or remove the containers (132, 133, etc.) to or from the automated storage (130) using the document transport (160) when the containers (132, 133, etc.) are stored or retrieved. For example, the container (132) may be removed by the accessor (131) from the automated storage (130) to be processed by the document processor (140) or moved by the accessor (131) to the automated storage (130) subsequent to being processed by the document processor (140). In another example, the container (132) may be removed by the accessor (131) from the automated storage (130) to be destroyed by the automated document destroyer (150). In one or more embodiments, the accessor (131) includes robotic components adapted to travel along a rail system disposed throughout the physical locations of the automated storage (130) for moving and removing the containers (132, 133, etc.) stored at such physical locations. In one or more embodiments, the document transport (160) is an extension of the rail system over which the accessor (131) travels between the automated storage (130), the document processor (140), and/or the automated document destroyer (150). Examples of such robotic components are described in U.S. Pat. Nos. 5,513,156 and 5,914,819.

In one or more embodiments of the invention, the repository (120) stores a master index (121) of the automated storage (130). As shown in FIG. 1, the master index (121) includes index entries (122, 123, etc.). In one or more embodiments, the index entry (122) includes container information (122*a*) (e.g., identification information consistent with the container label (132*a*) of the container (132)) and location information (122*b*) specifying a location in the automated storage (130) related to the container (132). For example, the location information (122*b*) may specify a logical location or a physical location based on which the accessor (131) stores or retrieves the container (132).

In one or more embodiments of the invention, the repository (120) stores a retention schedule (124) associated with the master index (121). As shown in FIG. 1, the retention schedule (124) includes retention entries (125, 126, etc.). In one or more embodiments, the retention entry (125) includes container ID (125*a*) and expiration information (125*b*). For example, the expiration information (125*b*) specifies an expiration date of one or more document items (e.g., 132*i*, 132*j*, etc.) contained in the container (132) identified by the container ID (125*a*). In one or more embodiments, the expiration date is specified on a per document item basis. In one or more embodiments, the expiration date is specified on a per container basis. In one or more embodiments, the container ID (125*a*), the container information (122), and the container label (132*a*) are correlated to associate containers (e.g., 132*i*, 132*j*, etc.) with index corresponding index entries (e.g., 122, 123, etc.) and corresponding retention entries (e.g., 125, 126, etc.). As noted above, in one or more embodiments, the master index (121) and the retention index (124) may be integrated in one data structure.

In one or more embodiments of the invention, the automated document destroyer (150) is configured to receive, verify, and destroy document items (e.g., 132*i*, 132*j*, etc.) in response to a command from the content manager (110). In one or more embodiments, the expired document items (e.g., 132*i*, 132*j*, etc.) are delivered to the automated document destroyer (150) by the accessor (131) in a coordinated fashion under the control of the content manager (110).

In one or more embodiments, the expired document items (e.g., 132*i*, 132*j*, etc.) are delivered and destroyed on a per container basis. For example, all document items (132*i*, 132*j*, etc.) stored in the container (132) may share the same expiration date and are removed on a per container basis from the automated storage (130) by the accessor (131) in response to a command from the content manager (110) to be destroyed by the automated document destroyer (150) when the expiration date expires. In such embodiments, the automated document destroyer (150) is configured to generate a certificate of destruction on a per container basis. In one or more embodiments, the certificate of destruction includes identification of all destroyed document items, time stamp of destruction, authorization of the destruction, and/or other relevant information. In one or more embodiments, an original paper document of the certificate of destruction is returned and stored as a replacement of the original document items (e.g., 132*i*, 132*j*, etc.) in the automated storage (130) and recorded as being destroyed in the index entry (122). For example, the container information (122*a*) may be updated to indicate the destruction of the expired document items (e.g., 132*i*, 132*j*, etc.). In one or more embodiments, a soft copy (e.g., an image) of the certificate of destruction is stored in the collection of the certificates of destruction (126).

In one or more embodiments, the expired document items (e.g., 132*i*, 132*j*, etc.) are delivered and destroyed on a per document item basis. For example, all document items (132*i*, 132*j*, etc.) stored in the container (132) may have different expiration dates and are removed from the automated storage (130) by the accessor (131) in response to a command from the content manager (110) to be destroyed by the automated document destroyer (150) on a per document item basis when the expiration date expires. In such embodiments, the automated document destroyer (150) is configured to generate a certificate of destruction on a per document item basis. In one or more embodiments, the certificate of destruction includes identification of the destroyed document item, date of destruction, authorization of the destruction, and/or other relevant information. In one or more embodiments, an original paper document of the certificate of destruction is returned and stored as a replacement of the original document item (e.g., 132i) in the automated storage (130) and recorded as being destroyed in the index entry (122). For example, the container information (122a) may be updated to indicate the destruction of the expired document item (e.g., 132i). In one or more embodiments, a soft copy (e.g., an image) of the certificate of destruction is stored in the collection of the certificates of destruction (126).

In one or more embodiments of the invention, the automated document destroyer (150) includes mechanisms for destroying paper based document items. For example, chemical reaction (e.g., burning, dissolution, erosion, etc.), physical reaction (e.g., mechanical shredding, etc.) or other destructive processes may be employed. In one or more embodiments, the automated document destroyer (150) is configured to receive a destruction command from the content manager (110) specifying the identification information (consistent with the container information (122a) and/or the container ID (125a)) of the container (132) containing expired document items (132i, 132j, etc.). The automated document destroyer (150) is further configured to verify content of the delivered container (132) by comparing the container label (132a) (e.g., using optical recognition of the barcode label, magnetic sensing of the magnetic tag, etc.) to the identification information contained in the received command. The automated document destroyer (150) is further configured to destroy the verified document item and generate a certificate of destruction based on the identification information.

In one or more embodiments, the expired document items (132i, 132j, etc.) are delivered to the automated document destroyer (150) on a per document basis and the destruction command received from the content manager (110) specifies the destruction on a per document item basis in a consistent manner. In one or more embodiments, the automated document destroyer (150) includes mechanisms for picking a single document item (132i) from the delivered container (132) in response to a document item level destruction commend from the content manager (110). In such embodiments, whether with the expired document (132i) delivered singly or in the container (132), the automated document destroyer (150) is further configured to destroy the document item (132) and generate a certificate of destruction on a per document item basis.

In one or more embodiments of the invention, the document processor (140) includes optical imaging and recognition mechanisms and is configured to perform pre-storage inspection, periodic auditing inspection, and/or check out/check in inspection of the container (132). In one or more embodiments, the document processor (140) is configured to obtain information regarding the document items in the aforementioned inspections to be included as document information or container information (122a). In one or more embodiments, the document processor (140) is further configured to generate (or create) and attach the container label (e.g., barcode label, magnetic strip, etc.) (132a) to the container (132) under the control of the content manager (110). In one or more embodiments, the document processor (140) is configured to perform the inspections, obtain information, and generate (or create) the container label (132a) under the control of the content manager (110).

In one or more embodiments of the invention, the document processor (140) is configured to generate a scanned image (not shown) of a document item (e.g., 132i) in response to a command from the content manager (110). For example, the document item (132i) may be scanned when it is removed from the automated storage (130) under a check out request and scanned again when it is returned to the automated storage (130) under the reciprocal check in request. In one or more embodiments, the document processor (140) is configured to generate a chain of custody certificate (not shown) with the scanned images of which the chain of custody certificate includes retrieval and return time stamps. In one or more embodiments, the scanned image and the chain of custody certificate are stored on a write-once-read-many (WORM) optical disk. For example, such WORM optical disk may be stored in the automated storage (130) in association with the corresponding document items. In one or more embodiments, relevant information of document item check out/check in and chain of custody activities is stored in the repository (120) as the chain of custody log (127).

In one or more embodiments of the invention, the content manager (110) includes a processor (111) and memory (112) storing instructions. When executed by the processor (111), the instructions include functionalities for:

(1) updating (e.g., adding, deleting, modifying, etc.) the index entries (122, 123, etc.) to the master index (121) when a container (e.g., 132) or document item (e.g., 132i) is stored or retrieved from the automated storage (130);

(2) updating (e.g., adding, deleting, modifying, etc.)) the retention entries (125, 126, etc.) to the retention schedule (124) as specified by an authorized user (not shown);

(3) causing the container (e.g., 132) to be retrieved from the automated storage (130), when identified as expired according to the retention entry (e.g., 125), based on the location information of the index entry (e.g., 122);

(4) causing an expired document item (e.g., 132i) of the container (e.g., 132) to be transferred to and destroyed by the automated document destroyer (150) based on the expiration information (e.g., 125b);

(5) generating, cooperatively with the document processor (140), a container label (132a) containing document information, for example obtained based on an inspection of the container (132) or the document item (e.g., 132i) contained in the container (132);

(6) updating (e.g., adding, deleting, modifying, etc.) the document information to the container label of the container (e.g., 132a) and the index entry (e.g., 122);

(7) performing, cooperatively with the document processor (140), an auditing inspection on a sample basis according to a pre-determined auditing schedule, for example for a fraction of all containers or for a fraction of document items contained in certain containers;

(8) generating a search-not-found ratio based on the sample fraction of the auditing schedule;

(9) generating a risk tolerance measure based on the sample fraction;

(10) tracking a statistics timeline of automated storage activities, for example related to storing the containers, adding the index entry to the master index, and adding the retention entry to the retention schedule;

(11) generating a decision/progress report based on the statistics timeline showing the level of activity of enterprise document managed by the enterprise content management system (100) in reference to an enterprise document universe;

(12) generating, cooperatively with the document processor (140), document item check out/check in scanned images and associated chain of custody certificate; and (13) creating, cooperatively with the document processor (140), WORM disks and the chain of custody index (127) for managing the WORM disks.

In one or more embodiments of the invention, the content manager (110) includes the input/output module (113) for interfacing with (e.g., sending commands to and receive information from) the automated storage (130), the document processor (140), and the automated document destroyer (150), as well as accessing the repository (120). In one or more embodiments, the input/output module (113) drives (i.e., sends commends in the form of direct driving signals) robotic actuator components and receives information from sensors of the automated storage (130), the document processor (140), and the automated document destroyer (150) directly via the robotic control channel (170).). In one or more embodiments, the input/output module (113) communicates (i.e., exchange commands and status information), via the robotic control channel (170), with intelligent on-board controllers of the automated storage (130), the document processor (140), and the automated document destroyer (150), which in turn drive robotic actuator components and collect sensor information.

Figure 2:
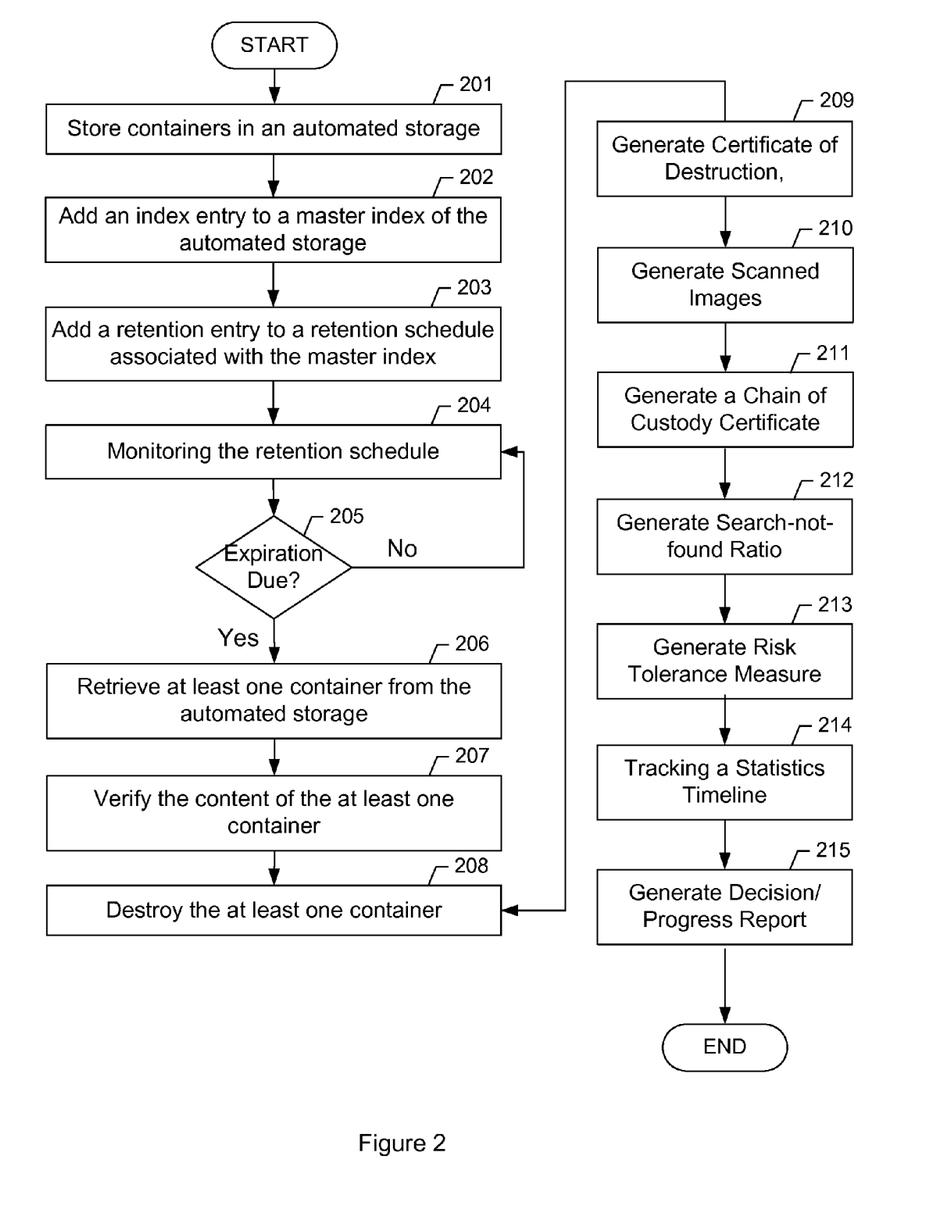
FIG. 2 shows a flowchart of a method according to aspects of the invention.

FIG. 2 depicts a flowchart of a method in accordance with one or more embodiments of the invention. In one or more embodiments of the invention, one or more of the steps shown in FIG. 2 may be omitted, repeated, and/or performed in a different order. Accordingly, embodiments of the invention should not be considered limited to the specific arrangements of steps shown in FIG. 2. In one or more embodiments of the invention, the method depicted in FIG. 2 may be practiced using the enterprise content management system (100) described with respect to FIG. 1 above.

Initially, in Step 201, containers are stored (e.g., initially deposited) in an automated storage. In one or more embodiments of the invention, each container is attached with a container label and contains document items. For example, the container may be a box while the document items may be file folders, paper documents, or a page of a paper document. In another example, the container may be a file folder while the document items may be paper documents or a page of a paper document. Examples of the container label may include barcode label, magnetic tag, etc.

In Step 202, an index entry is added to a master index of the automated storage to reflect the stored container. In one or more embodiments of the invention, the index entry includes identification information consistent with (e.g., retrieved from) the container label of the container and location information specifying a location (e.g., a logical location or a physical location) in the automated storage related to the container. In one or more embodiments, the automated storage is operative to store and retrieve the container based on the master index.

In one or more embodiments of the invention, the identification information of the container includes document information of the document item such as a document type and an enterprise department owning the document item. For example, the document type may be one of vital document, non-vital document, records vital/imaged, records vital/paper, non-record historical, non-record/supplies, non-record/forms, non-record/library, non-record/miscellaneous, etc., while the enterprise department may be one of corporate office, accounting department, operations department, marketing department, sales department, research and development department, legal department, etc.

In Step 203, a retention entry is added to a retention schedule associated with the master index. In one or more embodiments of the invention, the retention entry specifies expiration information of the container. For example, the specified expiration information includes expiration date and authorization for destruction by an authorized user of the enterprise having proper authority over the enterprise content management. In one or more embodiments, the expiration information is specified on a per container basis. In one or more embodiments, the expiration information is specified on a per document item basis.

In Step 204, the retention schedule is monitored. When the expiration date of the container is detected in Step 205 based on the retention entry, the container is caused to be retrieved from the automated storage based on the location information of the index entry (Step 206).

In Step 207, the content of the container is verified based on the identification information of the index entry. For example using the automated document destroyer of FIG. 1, the container information obtained by inspecting the container label is compared to the identification information of the index entry, which is contained in a command specifying the destruction of the container.

In Step 208, one or more document item contained in the container or the entire container content is destroyed based on the expiration information.

In Step 209, a certificate of destruction is generated based on the identification information. In one or more embodiments of the invention, certificate of destruction includes a time stamp associated with destruction of the document item(s).

In Step 210, a scanned image of the document item is generated. In one or more embodiments of the invention, the document item is scanned when it is removed by a check out request and when it is returned by a reciprocal check in request.

In Step 211, a chain of custody certificate is generated and appended with the scanned image. In one or more embodiments of the invention, the chain of custody certificate includes a time stamp of a time of retrieval/return of the document item. In one or more embodiments of the invention, the scanned image and the chain of custody certificate are stored on a write-once-read-many (WORM) optical disk. In one or more embodiments, the WORM optical disk is stored in the automated storage.

From time to time, an inspection is performed based on a sample fraction basis according to a pre-determined auditing schedule (e.g., weekly schedule, monthly schedule, quarterly schedule, annual schedule, variable periodic schedule, etc.). For example, the pre-determined auditing schedule may include a fraction of containers to be inspected or a fraction of document items contained in certain containers to be inspected. Further, the fraction may be determined based on a pre-determined sampling requirement.

In Step 212, a search-not-found ratio is generated based on the sample fraction of the performed inspection. In one or more embodiments of the invention, the search-not-found ratio is used as a reliability measure of the automated storage. In one or more embodiments of the invention, the search-not-found ratio is used as a reliability measure of the enterprise document retention practice using the automated storage.

In Step 213, a risk tolerance measure is generated based on the sample fraction. In one or more embodiments of the invention, the risk tolerance measure is used as an assessment regarding whether the reliability measure of the automated storage and/or the reliability measure of the enterprise document retention practice using the automated storage meets the enterprise requirements.

In Step 214, a statistics timeline is tracked relating to the activities in enterprise content management such as storing the containers, adding the index entry to the master index, and adding the retention entry to the retention schedule. In one or more embodiments of the invention, the statistics timeline is used as a measure of ongoing enterprise records retention compliance.

In Step 215, a decision/progress report is generated based on the statistics timeline in reference to an enterprise document universe. For example, the decision/progress report may include a percentage of all enterprise documents stored in the automated storage over all enterprise documents in existence. In one or more embodiments of the invention, the decision/progress report is generated on an ongoing basis and is used as a measure of progress in enterprise records retention compliance.

Figure 3:
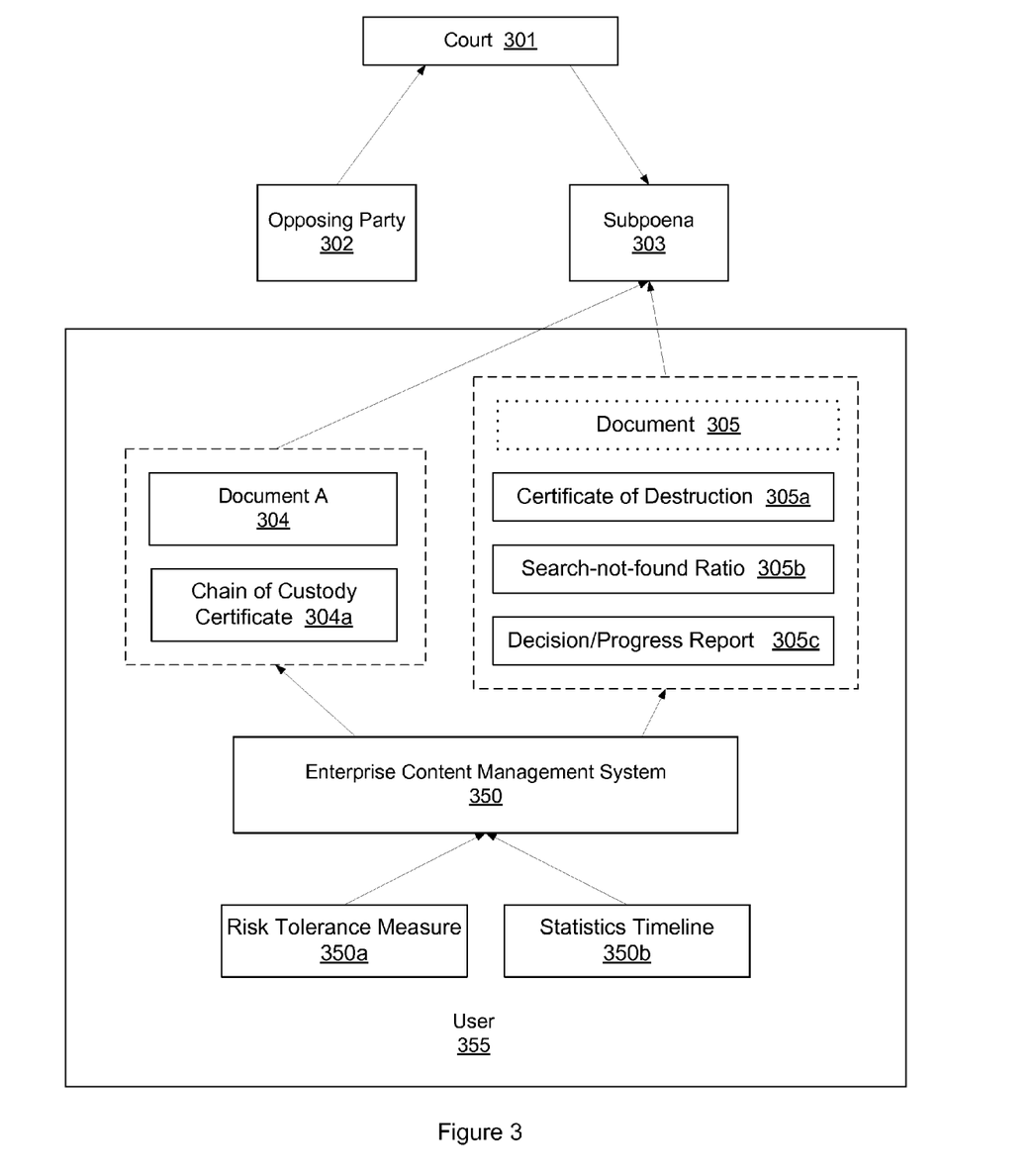
FIG. 3 shows an example according to aspects of the invention.

FIG. 3 shows an example according to aspects of the invention. In one or more embodiments of the invention, the example may be based on the method depicted in FIG. 2 and the system (100) described with respect to FIG. 1 above.

Generally speaking, when a subpoena (303) is presented for a document A (304) and document B (305), the recipient (355) must have either (1) an accurate inventory of records such that the subpoenaed document A (304) can be found and produced in a timely manner or (2) a proper evidence that the document B (305) was destroyed and a compliant records retention schedule evidencing such destruction. In order for the retention schedule to be compliant, it must (a) be based upon a sound file identification and accountability process, (b) be the subject of an official company retention policy (350a), and (c) have been uniformly and routinely enforced (350b).

Sometimes, legal discovery cannot be stopped, because the opposition party has a right to search for documents germane to a case. Being compliant makes this less of an intrusion, because the inventory can be copied and simply handed over given all of the required organization work has been done. Specifically, the retention schedule is a key element, because it allows any of these documents which may contain a "smoking gun" to be destroyed at the earliest possible time that is allowable. However, the courts do not accept the first testimony of a witness as proof of destruction. It typically requires further investigation and cross-examination during which the details and circumstances behind the testimony need to be presented that gives the testimony its credibility. Said in other words, just because one party submits a certificate of destruction, the court and opposition counsel may not accept its face value. They could ask questions that demand the real proof.

Therefore, if any one of the above listed components (1-3) and (a-c) is missing, the retention schedule and the claimed destruction can be in-validated in court. Processes necessary to guarantee such compliance are found in the example depicted in FIG. 3. For example, the court (301) issues a subpoena (303) based on a request submitted from an opposing party (302). The subpoena (303) requires that document A (304) and document B (305) be provided by the recipient party, which is the user (355) of the enterprise content management system (350). The enterprise content management system (350) and other related components in FIG. 3 are essentially the same as those described in reference to FIG. 1 and FIG. 2 above.

Responding to the subpoena (303), the user (355) submits the document A (304) accompanied with a chain of custody certificate (304a), both of which are retrieved from the enterprise content management system (350). Regarding the document B (305), the user (355) submits the certificate of destruction (305a) accompanied with the search-not-found ratio (305b) and decision/progress report (305c), all of which are retrieved from the enterprise content management system (350).

In so doing, the user (355) demonstrates to the court (301) the following:

(1) an accurate inventory of records (i.e., the use of the enterprise content management system (350) and the chain of custody certificate (304a)) allowing the subpoenaed document A (304) to be found and produced in a timely manner;

(2) a proper evidence (i.e., the certificate of destruction (305a)) that the document B (305) was destroyed and a compliant records retention schedule evidencing such destruction where the retention schedule (a) is based upon a sound file identification (i.e., the search-not-found ratio (305b)) and accountability process (i.e., the decision/progress report (305c)), (b) is the subject of an official company retention policy (i.e., risk tolerance measure (350a)), and (c) have been uniformly and routinely enforced (i.e., statistics timeline (350b)).

Figure 4:
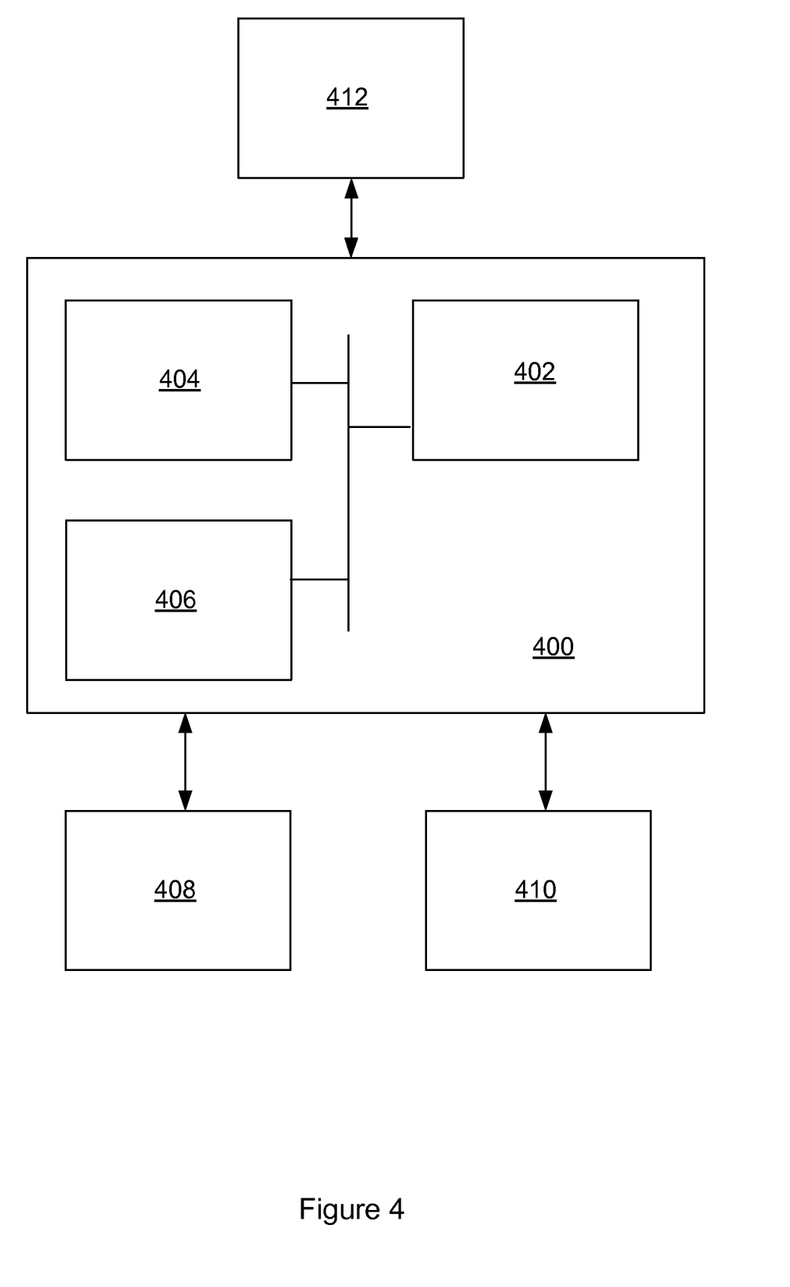
FIG. 4 shows a computer system according to aspects of the invention.

Embodiments of the invention may be implemented on virtually any type of computer regardless of the platform being used. For example, as shown in FIG. 4, a computer system (400) includes one or more processor(s) (402), associated memory (404) (e.g., random document access memory (RAM), cache memory, flash memory, etc.), a storage device (406) (e.g., a hard disk, an optical drive such as a compact disk drive or digital video disk (DVD) drive, a flash memory stick, etc.), and numerous other elements and functionalities typical of today's computers (not shown). The computer (400) may also include input means, such as a keyboard (408), a mouse (410), or a microphone (not shown). Further, the computer (400) may include output means, such as a monitor (412) (e.g., a liquid crystal display (LCD), a plasma display, or cathode ray tube (CRT) monitor) for example to display various results. The computer system (400) may be connected to a network (not shown) (e.g., a local area network (LAN), a wide area network (WAN) such as the Internet, or any other similar type of network) with wired and/or wireless segments via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Further, those skilled in the art will appreciate that one or more elements of the aforementioned computer system (400) may be located at a remote location and connected to the other elements over a network. Further, embodiments of the invention may be implemented on a distributed system having a plurality of nodes, where each portion of the invention (e.g., various modules of FIG. 1) may be located on a different node within the distributed system. In one embodiments of the invention, the node corresponds to a computer system. Alternatively, the node may correspond to a processor with associated physical memory. The node may alternatively correspond to a processor with shared memory and/or resources. Further, software instructions for performing embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for enterprise content management, comprising:
   storing a plurality of containers in an automated storage, at least one container having a container label and containing a plurality of document items;
   adding, using a processor of a computer, an index entry to a master index of the automated storage, wherein the index entry comprises identification information retrieved from the container label of the at least one container and location information specifying a location in the automated storage related to the container, wherein the automated storage is operative to store and retrieve the at least one container based on the master index;
   adding, using the processor of the computer, a retention entry to a retention schedule associated with the master index, wherein the retention entry specifies expiration information of the at least one container;
   causing, using the processor of the computer based on the retention entry, the at least one container to be retrieved from the automated storage based on the location information of the index entry;
   verifying the content of the at least one container based on the identification information of the index entry;
   destroying at least one document item of the plurality of document items based on the expiration information; and
   generating a certificate of destruction based on the identification information and comprising a time stamp associated with destruction of the at least one document item.

2. The method of claim 1, wherein the at least one container is one of a box and a file folder, the document item is one of the file folder, a document, and a document page, the container label is a container barcode label, the method further comprising:
   attaching a barcode label to the at least one document item, wherein the barcode label includes document information obtained based on an inspection of the at least one document item; and
   adding the document information to the container label of the at least one container and the index entry associated with the at least one container,
   wherein the inspection is one of a pre-storage inspection prior to storing the plurality of containers in the automated storage and audit inspection subsequent to storing the plurality of containers in the automated storage, and
   wherein the barcode label and the container label are generated using the processor of the computer.

3. The method of claim 2, wherein the expiration information comprises an authorization level required for destroying the at least one document item.

4. The method of claim 2,
   wherein the expiration information of the at least one container comprises expiration information specific to the at least one document item, and
   wherein the certificate of destruction is specific to the at least one document item.

5. The method of claim 2, wherein the inspection is performed based on a sample fraction basis comprising one of a fraction of the plurality of container and a fraction of the plurality of document items in the at least one container, the method further comprising:
   generating, using the processor of the computer, a search-not-found ratio based on the sample fraction; and
   generating, using the processor of the computer, a risk tolerance measure based on the sample fraction.

6. The method of claim 1,
   wherein at least one of the identification information of the at least one container and the document information of the at least one document item comprises at least one of a document type and an enterprise department,
   wherein the document type comprises one of vital document, non-vital document, records vital/imaged, records vital/paper, non-record historical, non-record/supplies, non-record/forms, non-record/library, and non-record/miscellaneous, and
   wherein the enterprise department is related to at least one of the at least one container and the at least one document item, comprising at least one of corporate office, accounting department, operations department, marketing department, sales department, research and development department, and legal department.

7. The method of claim 1, further comprising:
   tracking, using the processor of the computer, a statistics timeline related to at least one of the storing the plurality of containers, the adding the index entry to the master index, and the adding the retention entry to the retention schedule; and
   generating a decision/progress report based on the statistics timeline in reference to an enterprise document universe.

8. The method of claim 1, wherein the certificate of destruction comprises a certificate of destruction ordered for legal hold protection.

9. The method of claim 1, further comprising:
   retrieving the at least one document item from the automated storage;
   generating a scanned image of the at least one document item;
   appending a chain of custody certificate with the scanned image, wherein the chain of custody certificate comprises a time stamp of a time of retrieval of the at least one document item;
   storing the scanned image and the chain of custody certificate on a write-once-read-many (WORM) optical disk; and
   storing the WORM optical disk in the automated storage.

10. A computer readable medium storing instructions when executed by a processor comprises functionalities for:
   storing a plurality of containers in an automated storage, at least one container having a container label and containing a plurality of document items;
   adding, using a processor of a computer, an index entry to a master index of the automated storage, wherein the index entry comprises identification information retrieved from the container label of the at least one container and location information specifying a location in the automated storage related to the container, wherein the automated storage is operative to store and retrieve the at least one container based on the master index;
   adding, using the processor of the computer, a retention entry to a retention schedule associated with the master index, wherein the retention entry specifies expiration information of the at least one container;
   causing, using the processor of the computer based on the retention entry, the at least one container to be retrieved from the automated storage based on the location information of the index entry;
   verifying the content of the at least one container based on the identification information of the index entry;

destroying at least one document item of the plurality of document items based on the expiration information; and generating a certificate of destruction based on the identification information and comprising a time stamp associated with destruction of the at least one document item.

11. The computer readable medium of claim 10, wherein the at least one container is one of a box and a file folder, the document item is one of the file folder, a document, and a document page, the container label is a container barcode label, the instruction when executed by the processor further comprising functionalities for:

attaching a barcode label to the at least one document item, wherein the barcode label includes document information obtained based on an inspection of the at least one document item; and adding the document information to the container label of the at least one container and the index entry associated with the at least one container, wherein the inspection is one of a pre-storage inspection prior to storing the plurality of containers in the automated storage and audit inspection subsequent to storing the plurality of containers in the automated storage, and wherein the barcode label and the container label are generated using the processor of the computer.

12. The computer readable medium of claim 11, wherein the expiration information comprises an authorization level required for destroying the at least one document item.

13. The computer readable medium of claim 11, wherein the expiration information of the at least one container comprises expiration information specific to the at least one document item, and wherein the certificate of destruction is specific to the at least one document item.

14. The computer readable medium of claim 11, wherein the inspection is performed based on a sample fraction basis comprising one of a fraction of the plurality of container and a fraction of the plurality of document items in the at least one container, the instruction when executed by the processor further comprising functionalities for:

generating, using the processor of the computer, a search-not-found ratio based on the sample fraction; and generating, using the processor of the computer, a risk tolerance measure based on the sample fraction.

15. The computer readable medium of claim 10, wherein at least one of the identification information of the at least one container and the document information of the at least one document item comprises at least one of a document type and an enterprise department, wherein the document type comprises one of vital document, non-vital document, records vital/imaged, records vital/paper, non-record historical, non-record/supplies, non-record/forms, non-record/library, and non-record/miscellaneous, and wherein the enterprise department is related to at least one of the at least one container and the at least one document item, comprising at least one of corporate office, accounting department, operations department, marketing department, sales department, research and development department, and legal department.

16. The computer readable medium of claim 10, the instruction when executed by the processor further comprising functionalities for:

tracking, using the processor of the computer, a statistics timeline related to at least one of the storing the plurality of containers, the adding the index entry to the master index, and the adding the retention entry to the retention schedule; and generating a decision/progress report based on the statistics timeline in reference to an enterprise document universe.

17. The computer readable medium of claim 10, wherein the certificate of destruction comprises a certificate of destruction ordered for legal hold protection.

18. The computer readable medium of claim 10, the instruction when executed by the processor further comprising functionalities for:

retrieving the at least one document item from the automated storage;

generating a scanned image of the at least one document item;

appending a chain of custody certificate with the scanned image, wherein the chain of custody certificate comprises a time stamp of a time of retrieval of the at least one document item;

storing the scanned image and the chain of custody certificate on a write-once-read-many (WORM) optical disk; and storing the WORM optical disk in the automated storage.

* * * * *